Patented Mar. 15, 1932

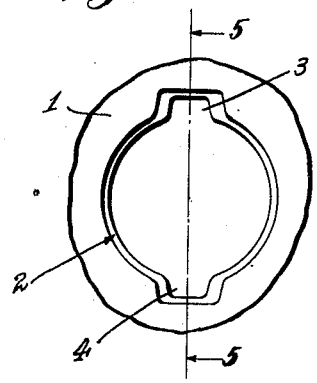
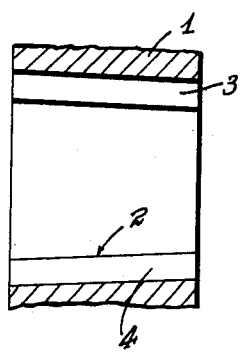
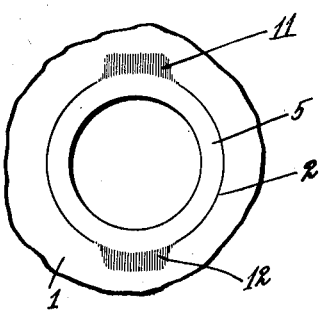
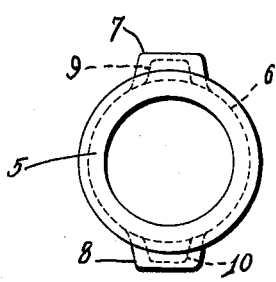
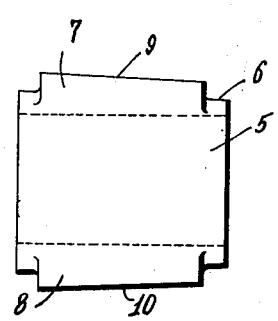
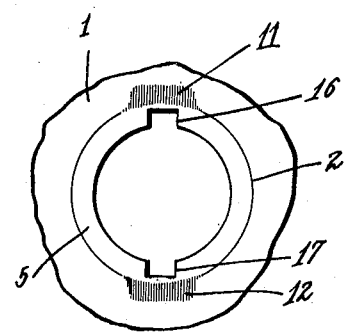
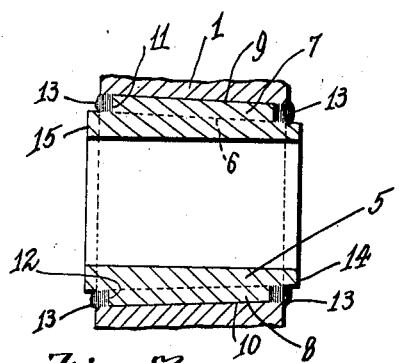
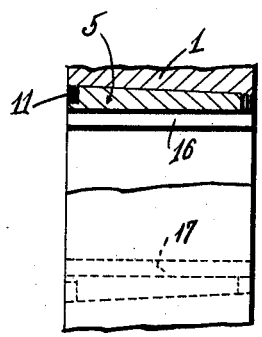

1,849,186

UNITED STATES PATENT OFFICE

WILLIAM S. GRAU, OF INGLEWOOD, AND JAMES O. BISHOP, OF TORRANCE, CALIFORNIA, ASSIGNORS TO THE NATIONAL SUPPLY COMPANY OF DELAWARE, OF NEW YORK, N. Y., A CORPORATION OF DELAWARE

SOFT CORE FOR HARD MATERIALS AND METHOD OF APPLYING SAME

Application filed April 25, 1927. Serial No. 186,342.

This invention relates to soft cores for hard materials and methods of applying the same, and is more particularly directed to a method of fabricating or manufacturing hard material products, such as manganese steel, which are very difficult to machine.

In the manufacture or fabrication of hard material products such, for example, as manganese steel or the like, which are very difficult to machine, it has been found that the method heretofore practiced of casting into the product an insert of soft steel is unsatisfactory, due to the fact that these cast inserts will work loose in service, partially due to the difference in shrinkage of the two metals, and also partially due to the fact that the hot metal forming the cast insert flowing around and striking the cold core will not adhere or bind to the core perfectly.

It is therefore an object of this invention to provide a method of fabricating hard steel products, including the casting of a hard steel product having an enlarged axial bore, and mounting in the bore an insert liner of mild steel and welding the insert liner in position.

Another object of this invention is to provide a method of fabricating manganese steel products, such as manganese clutches and small parts, including the forming of the product of manganese steel to substantially the form desired, with an enlarged axial bore, mounting an insert liner of mild steel in the bore, and welding the liner in position.

Another object of this invention is to provide a method of fabricating hard steel products, including forming the product of hard steel to substantially the form desired, with an enlarged bore having a pair of outwardly extending ways, mounting an insert liner of mild steel having a pair of guides formed integral therewith adapted to fit in the ways in the bore, and welding the liner in position.

Another object of this invention is to provide a method of fabricating manganese steel products, including the casting of the manganese steel product to substantially the form desired, with an enlarged axial bore, forming a mild steel liner, pressing the mild steel liner in the bore of the manganese product, and welding the liner in position.

Another object of this invention is to provide a method of fabricating manganese steel products, including the forming of the product of manganese steel to substantially the form desired, heating the manganese steel product, press-fitting a mild steel liner in the bore of the product, allowing the manganese steel product to cool to contract on the mild steel liner, and welding the liner in position.

Other objects and advantages of this invention it is believed will be apparent from the following detailed description of a preferred embodiment of this invention, as illustrated in the accompanying drawings.

In the drawings:

Figure 1 is a fragmental end elevation of a manganese steel product illustrating the same as cast with parallel ways in substantial alignment with the central axis of the product.

Figure 2 is a sectional side elevation thereof.

Figure 3 is an end elevation of a mild steel insert.

Figure 4 is a side elevation of the mild steel insert illustrated in Fig. 3.

Figure 5 is an end elevation illustrating the mild steel liner as mounted within the bore of the cast hard steel product and welded in position.

Figure 6 is a similar end elevation illustrating parallel keyways formed in the liner in accurate alignment with the central axis of the manganese steel product.

Figure 7 is a side elevation of the product as illustrated in Fig. 5, with a mild steel liner inserted in the bore of the hard steel product.

Figure 8 is a sectional side elevation of the finished product, as illustrated in Fig. 6.

In the preferred embodiment of this invention illustrated in the accompanying drawings, 1 illustrates a cast steel product, preferably formed of manganese or other hard steel, or material which is difficult to machine. The casting 1 may be a clutch sprocket, collar or other small manganese casting, and has a bore 2 by means of which the casting 1 is adapted to be mounted upon and secured to a shaft (not shown). The bore 2 of the casting 1 is illustrated as tapered. Formed in the casting 1 during the formation of the same are parallel ways 3 and 4, which are formed in substantial alignment with the central axis of the casting 1.

A liner 5 formed of relatively soft or mild steel is formed with an exterior taper 6 adapted to fit closely within the tapered bore 2 of the casting 1. Cast or formed integral with the liner 6 is a pair of guides or keys 7 and 8, which are tapered at their exterior arcuate surfaces 9 and 10 to fit closely within the ways 3 and 4 formed in the manganese steel casting 1.

It has been found preferable in mounting the cast steel liner 5 into the bore 2 of the manganese or other hard steel product 1 to first heat the manganese steel product 1 to a temperature of substantially 500° F., and then to force the mild steel liner 5 into the bore of the casting 1 under pressure, either on a press, steam hammer or other similar appliance. In driving the cast steel liner into place in the bore 2 of the casting 1, it has been found that the liner 5 will wedge itself into place and any small irregularities on the surface of the liner 5 will be cut off, so that a comparatively perfect fit is obtained between the liner 5 and casting 1. As the manganese or hard steel product 1 has been heated, it will shrink onto the soft steel insert liner 5 when cooling, causing a still tighter and more perfect fit to be obtained between the casting 1 and liner 5.

The guides or keys 9 and 10 formed on the mild steel liner 5 are of less length than the ways 3 and 4 formed in the casting 1, so that recesses 11 and 12 are formed at the opposite ends of the ways 3 and 4 after the liner 5 has been press-fitted into position, the recesses 11 and 12 are then filled by welding steel into the same by either electric or acetylene welding process.

After the liner 5 has been press-fitted into the bore 2 of the casting 1, and the recesses 11 and 12 formed at the opposite ends of the product have been filled by welding up the same, the casting is then turned at its ends to remove the surplus welding material, as illustrated at 13 in Fig. 7, and also to cut away the protruding ends 14 and 15 of the liner 5 to produce a finished product, as shown in Fig. 8. After the product has been machined to trim the ends of the same, and after the inner bore of the liner 5 has been machined cut to a predetermined diameter, keyways 16 and 17 are cut in the mild steel liner 5 in accurate alignment with the longitudinal axis of the bore 2 of the casting 1.

The liner 5 as illustrated in the drawings is of greater length than the steel casting 1, and the guides or keys 7 and 8 formed therein are of less length than the casting 1, so as to provide recesses 11 and 12 adapted to receive the welded steel to form a lock between the liner 5 and casting 1. Another method of forming a lock between the liner 5 and casting 1 is to form the entire liner 5 of a less length than the casting 1, so that a circumferentially extending recess will be formed between the casting 1 and the liner 5, which may be filled by welding up the same, and this latter method will add a safety factor to insure positive locking of the soft steel insert 5 in position within the casting 1. The casting 1 as illustrated in the drawings may constitute the hub of a clutch sprocket or collar, or the hub of any other similar manganese steel product.

Having fully described our invention, it is to be understood that the same is not limited to the details herein set forth, but that our invention is of the scope of the appended claims.

We claim:—

1. A method of fabricating hard steel products, including forming the hard steel product to substantially the form desired with an enlarged axial bore, heating the hard steel product, press-fitting an insert liner of mild steel in the bore, permitting the hard steel product to cool, and welding the liner in position.

2. A method of fabricating manganese steel products, including forming the product of manganese steel to substantially the form desired with an enlarged axial bore and having a way extending into the product from the bore, press-fitting a mild steel liner in the bore with a key fitting into the way and of less length than the way, and filling the recesses provided at the ends of the key of the liner within the way by welding the steel therein.

3. A method of fabricating hard steel products, including forming the product of hard steel to substantially the form desired with an enlarged axial bore, press-fitting an insert liner of mild steel in the bore, welding the liner in position, and cutting a keyway in the liner in accurate alignment with the axis of the hard steel product.

4. A method of fabricating manganese steel products, including forming the manganese steel product to substantially the form desired with an enlarged axial bore, press-fitting an insert liner of mild steel in the bore, welding the liner in position, and forming a pair of substantially parallel ways in accurate alignment with the longitudinal axis of the product.

5. A method of fabricating manganese steel products, including forming the manganese product to substantially the form desired with an enlarged tapered axial bore having ways extending into the manganese product from the bore, press-fitting a tapered insert liner of mild steel having keys in the bore with the keys fitting into the ways, and welding the liner in position.

6. A relatively hard steel product having an oversized tapered bore formed therethrough and having ways extending into the product from the bore, a mild steel insert mounted in the bore and having keys fitting in the ways, the keys being of less length than the ways to provide welding recesses at the ends of the keys in which steel locks are welded, and a keyway formed in the mild steel liner in accurate alignment with the longitudinal axis of the hard steel product.

Signed at Torrance, California, this 18th day of April 1927.

WILLIAM S. GRAU.
JAMES O. BISHOP.